FIG. 1.

INVENTOR.
HENRY THOMAS PLATZ

FIG. 2.

June 9, 1942.　　　H. T. PLATZ　　　2,286,104
WELDING EQUIPMENT
Filed Nov. 1, 1940　　　6 Sheets-Sheet 3

INVENTOR.
HENRY THOMAS PLATZ
ATTORNEYS

June 9, 1942.  H. T. PLATZ  2,286,104
WELDING EQUIPMENT
Filed Nov. 1, 1940  6 Sheets-Sheet 5

INVENTOR.
HENRY THOMAS PLATZ
BY
Whittemore Hulbert & Belknap
ATTORNEYS

June 9, 1942.  H. T. PLATZ  2,286,104
WELDING EQUIPMENT
Filed Nov. 1, 1940   6 Sheets-Sheet 6

INVENTOR.
HENRY THOMAS PLATZ
BY
ATTORNEYS

Patented June 9, 1942

2,286,104

UNITED STATES PATENT OFFICE 2,286,104

WELDING EQUIPMENT

Henry Thomas Platz, Detroit, Mich., assignor to Briggs Manufacturing Company, Detroit, Mich., a corporation of Michigan Application November 1, 1940, Serial No. 363,936

14 Claims. (Cl. 219—4)

This invention relates generally to welding apparatus and refers more particularly to improvements in welders operating on the resistance principle.

One of the principal objects of this invention resides in the provision of means for accurately controlling the operation of the welder in accordance with the particular characteristics of the metal to be welded so as to insure obtaining a strong homogeneous weld free from pores or cracks.

Another object of this invention which contributes materially to obtaining the foregoing advantageous feature consists in providing means for accurately predetermining the interval forging pressure is applied to the work with reference to the welding period.

Another object of this invention consists in providing a welder having an electrode movable into engagement with the work by fluid pressure admitted to the electrode cylinder at a predetermined rate sufficient to contact the electrode with the work and having a valve responsive to a predetermined increase in pressure in the cylinder to operate a switch and close the welding circuit through the electrode.

A further object of this invention resides in the provision of a welder of the type previously set forth having a valve responsive to a predetermined increase in pressure in the electrode cylinder greater than the pressure required to open the switch controlling valve aforesaid to admit fluid under pressure to the electrode cylinder at a substantially faster rate and thereby apply a forging pressure to the work.

A still further object of this invention consists in providing a welder having means for independently regulating the operation of both the valves previously referred to so as to enable obtaining the relationship between the welding interval and the forging pressure required to secure a strong homogeneous weld of the particular metal to be welded. For example, in welding metals having a high thermal conductivity, such as aluminum or aluminum alloy, it is desirable to apply the forging pressure during the welding period or before the metal has an opportunity to solidify in order to avoid excessive porosity and cracking of the metal, which is, of course, objectionable because it materially weakens the weld. On the other hand, when welding other types of metals having a low heat conductivity, it may be advisable to apply the forging pressure subsequent to the welding period, and this may be accomplished by proper adjustment of the valve controlling the introduction of the forging pressure into the electrode cylinder.

In addition to the foregoing, the present invention contemplates a relatively simple, compact welder capable of producing a large number of welds in a relatively short time.

The foregoing as well as other objects will be made more apparent as this description proceeds, especially when considered in connection with the accompanying drawings, wherein.

The welding device selected herein for the purpose of illustrating the present invention is of the portable gun type having a pair of electrodes 20 and 21 relatively movable toward and away from each other by fluid under pressure. Upon reference to Figure 2, it will be noted that the lower electrode 20 is suitably mounted on the free end of an arm 22 having the opposite end secured to a part 23 of the welder frame and electrically connected in one side of the welding circuit in accordance with the usual practice, not shown herein.

The cooperating electrode 21 is suitably secured to a fixture 24 in alignment with the electrode 20 and the fixture 24 is, in turn, secured to the lower end of a plunger 25 having a tubular portion 26 reciprocably mounted in a piston 27. The piston 27 is slidably mounted in a cylinder 28 having a bottom section 29 and a top section 30 forming a head separable from the bottom section. The bottom section 29 of the cylinder is preferably formed integral with the welder frame and is secured to the head section 30 by means of the studs 31.

Figure 2:
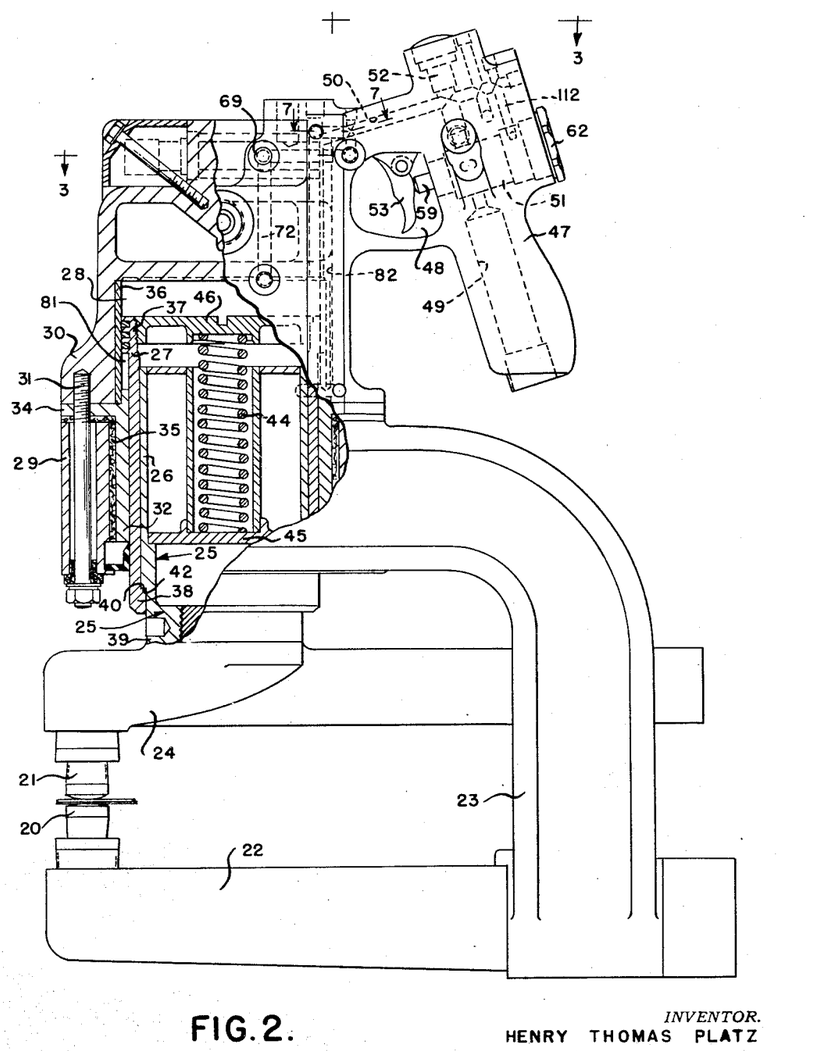
Figure 2 is a side elevation view partly in section of a welder constructed in accordance with this invention.

As shown in Figure 2, a sleeve 32 of relatively hard metal forms a lining for the bottom section 29 of the cylinder and is provided with a radially outwardly extending flange 34 adapted to be clamped between the adjacent ends of the cylinder sections by the studs 31. An intermediate sleeve 35 of insulating material is arranged between the adjacent surfaces of the lining 32 and bottom section 29 of the cylinder so as to insulate the electrode 21 from the electrode 20. For the same purpose, the studs 31 are insulated from electrical contact with the bottom section 29 of the cylinder.

The head section 30 of the cylinder 28 is also lined with a hard metal sleeve 36 and has a greater internal diameter than the corresponding diameter of the lining sleeve 32 in the bottom section 29 of the cylinder. The lining sleeve 32 slidably engages the side walls of the piston 27 and the latter is provided with an enlarged head 37 for slidably engaging the lining sleeve 36 in the head section 30 of the cylinder. The lower end of the piston 27 extends downwardly beyond the corresponding end of the cylinder 28 and has a reduced portion 38 slidably engaging a reduced portion 39 on the plunger 25. The above construction is such that downward movement of the piston 27 relative to the plunger 25 is limited by engagement of the head of the piston with the top of the plunger. On the other hand, upward movement of the piston 27 relative to the plunger 25 is limited by engagement of an annular shoulder 40 on the plunger with a cooperating shoulder 42 formed on the piston by the reduced portion 38 at the lower end of the piston.

The piston 27 is normally maintained in its uppermost position with reference to the plunger 25 and this is accomplished by means of a coil spring 44 positioned in coaxial relationship with the axis of the piston 27. The upper end of the coil spring abuts the bottom surface of the head 37 on the piston, and the lower end of the coil spring rests against a plate 45 secured in the tubular portion 26 of the plunger 25 adjacent the lower end of the latter. In other words, the coil spring 44 normally maintains the shoulder 42 on the lower end of the piston 27 in abutting engagement with the shoulder 40 on the plunger 25. The arrangement is such that initial downward movement of the piston 27 from its uppermost position imparts a corresponding downward movement to the plunger 25 through the coil spring 44 to move the electrode 21 into engagement with the work. As soon as the electrode 21 engages the work, the piston 27 continues its downward movement relative to the plunger 25 against the action of the spring 44. As a result, a steadily increasing pressure is applied to the work by the electrode 21 and this pressure reaches its maximum when the head 37 of the piston 27 positively abuts the upper end of the plunger 25. It may be pointed out at this time that the central portion 46 of the piston is formed separately from the head 37 and is threadedly secured in place to permit adjusting tension of the coil spring 44.

In the present instance, fluid pressure is employed to move the piston 27 downwardly in the cylinder 28 to engage the electrode 21 with the work and is, also, employed to return the piston 27 to its uppermost position in the cylinder 28 to release the electrode 21 from the work. In this connection it will be noted from Figure 2 that the head section 30 of the cylinder is provided with a pistol grip 47 and is also formed with a trigger recess 48 adjacent the grip 47. The grip 47 is fashioned with a passage 49 therethrough communicating at the lower end with a source of fluid under pressure and communicating at the upper end with the passage 50. The passage 50 is formed in the head section 30 of the cylinder and communicates with the interior of the cylinder 28 at the upper end of the latter. The flow of fluid pressure from the source of supply to the cylinder 28 is controlled by a valve 51 and is regulated by a metering valve 52 located at the discharge side of the valve 51.

The valve 51 is manually operated by means of a trigger 53 pivotally mounted on the head 30 and extending into the recess 48 for convenient manipulation by the operator. Upon reference to Figure 5, it will be noted that the valve 51 comprises a cylinder in the form of a sleeve 54 fixed in a bore 55 formed in the head 30 directly above the grip 47 in rear of the trigger recess 48 and having ports 56 in opposite side walls respectively communicating with the fluid pressure supply passages 49 and 50. Communication between the ports 56 is controlled by a piston in the form of a tubular plunger 57 slidably mounted in the cylinder element 54 and having an annular groove 58 formed in the outer surface thereof for registration with both the ports 56 when the piston 57 is in its retracted position, shown in Figure 5.

Figures 4, 5, 6:
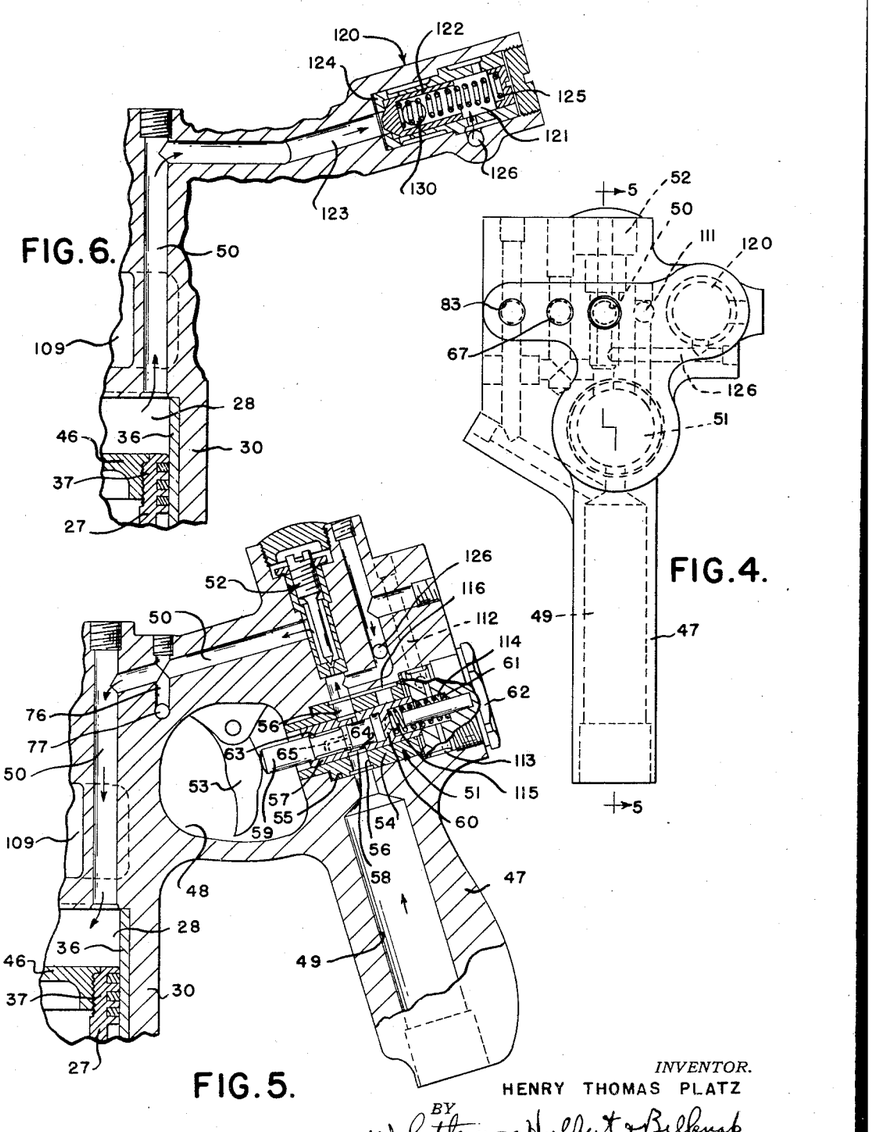
Figure 4 is an end elevation view of a portion of the welder shown in Figure 2.
Figure 5 is a sectional view taken substantially on the line 5—5 of Figure 4.
Figure 6 is a sectional view taken substantially on the line 6—6 of Figure 3.

The piston 57 is moved to its retracted position by means of a plunger 59 slidably mounted in the piston 57 with the forward end extending beyond the corresponding end of the piston for engagement with the trigger 53 and engageable at the rear end with a transverse partition 60 formed in the tubular piston 57 intermediate the ends of the latter. The opposite side of the partition 60 forms an abutment for the forward end of a coil spring 61 located in the cylinder 54 and having the rear end abutting a closure cap 62 which is threaded in the rear end of the bore 55. It follows from the above that the spring 61 normally urges the piston 57 to its outermost position wherein the annular recess 58 in the piston 57 is out of registration with the ports 56 and communication between the fluid pressure supply passage 49 and the passage 50 is closed.

With the above construction, it will be noted that operation of the welder is initiated by manipulating the trigger 53 to move the plunger 59 rearwardly into engagement with the abutment or partition 60 formed on the piston 57. Continued rearward movement of the plunger 59 by the trigger effects a corresponding movement of the piston 57 against the action of the spring 61 and registers the annular groove 58 in the piston with the ports 56 in the cylinder 54. Inasmuch as the ports 56 register with the passages 49 and 50, it follows that fluid under pressure flows into the upper end of the cylinder 28 through the passage 50. The rate of flow of fluid under pressure into the cylinder 28 is regulated by the metering valve 52 which is adjustable to, in turn, vary the rate of travel of the piston in a downward direction to engage the electrode 21 with the work.

Attention is called to the fact, at this time, that the plunger 59 is returned to its forwardmost position by the fluid pressure flowing from the source of the supply through the passage 49. Referring again to Figure 5, it will be noted that the rear portion of the plunger 59 is reduced to form an annular chamber 63 around the plunger which communicates with the annular chamber 58 surrounding the piston 57 by means of a port 64 and also communicates with the space in rear of the plunger 59 by means of a passage 65 formed in the plunger. As a result, when the piston 57 is in its rearwardmost position, fluid pressure builds up behind the plunger 59 and returns the latter to its forwardmost position against any pressure that may be applied to the trigger 53 by the operator.

When the pressure of the fluid admitted to the upper end of the cylinder 28 by the passage 50 exceeds a predetermined amount, a valve 66 is operated to admit fluid pressure to the cylinder 28 at a substantially faster rate and thereby effect the forging operation on the weld. Referring to Figures 1, 3, 4, and 10, it will be noted that the valve 66 is located in a fluid pressure supply line 67 having one end communicating with the discharge side of the valve 51 in advance of the metering valve 52 so as not to be effected by the latter and having the opposite end communicating with the upper end of the cylinder 28. In detail, it will be noted from Figure 3 that the forward end of the passage 67 communicates with a branch passage 68 having one end registering with a port 69 formed in the valve casing 70 intermediate the ends of the latter in alignment with a second port 71 formed in the opposite side of the casing. The port 71 communicates with a passage 72 and the latter, in turn, opens directly into the upper end of the cylinder 28.

The flow of fluid under pressure through the passage 67 into the cylinder is normally prevented by means of a valve plunger 73 reciprocably mounted in the valve casing 70 and normally urged to its uppermost position in the valve casing by means of a spring 74. When the valve plunger 73 is in its uppermost position, shown in Figure 3 of the drawings, the inlet port 69 is closed by the valve plunger and movement of the electrode piston 27 is accomplished solely by the fluid under pressure admitted to the cylinder 28 through the metering valve 52.

As stated above, when the fluid under pressure admitted to the cylinder 28 exceeds a predetermined amount, the valve plunger 73 is moved downwardly against action of the spring 74 to register the ports in the valve casing with an annular recess 75 formed in the outer wall of the plunger. The plunger 73 is moved downwardly against the action of the spring 74 by fluid under pressure. In this connection, attention is directed to Figures 3, 5, and 11 wherein, it will be noted that the fluid pressure supply passage 50 is provided with a lateral branch 76 which communicates with a passage 77 having one end communicating with the valve casing 70 through the upper end of the latter. As a result, fluid pressure from the metering valve 52 acts directly on the upper end of the valve plunger 73 and when this pressure exceeds the force of the spring 74, the valve plunger 73 is moved downwardly to register the annular recess 75 with the ports 69 and 70. This permits the high pressure from the source of supply to flow directly into the upper end of the cylinder 28 through the passages 67, 68, and 72.

The pressure at which the valve 66 opens to admit high pressure into the cylinder 28 is controlled by adjusting the tension of the spring 74. As shown particularly in Figure 3, the lower end of the spring 74 rests upon a plunger 78 slidably mounted in the valve casing 70 and adapted to be adjusted relative to the casing by means of the adjusting nut 79. The adjusting nut 79 is located for convenient manipulation by the operator and is preferably provided with an indicator 80 movable with the nut relative to an adjacent graduated dial (not shown) to indicate the pressure at which the valve 66 is adapted to open.

The above construction is such that the fluid pressure admitted into the upper end of the cylinder 28 through the metering valve 52 is sufficient to move the piston 27 and plunger 25 downwardly as a unit to engage the electrode 21 with the work. When the fluid pressure admitted to the cylinder 28 exceeds the amount to which the valve 66 is adjusted, the latter automatically opens and fluid pressure is supplied to the upper end of the cylinder 28 at a much faster rate. This pressure exceeds the strength of the spring 44 acting on the piston 27 and moves the piston downwardly relative to the plunger 25 to engage the head 37 on the piston with the upper end of the plunger 25. This increased pressure is applied to the work by the electrode 21 and is sufficient to accomplish the forging operation.

It has been stated above that the electrode 21 is moved in a direction away from the work by fluid under pressure, and this is accomplished when the cylinder 28 is exhausted. In this connection, attention is directed to Figure 2 wherein, it will be noted that when the piston 27 is in its downwardmost position, a relatively small annular space 81 exists around the piston beteen the upper end of the lining sleeve 32 and the lower end of the enlarged head 37 on the piston. This annular space communicates with a fluid pressure supply passage 82 which extends upwardly through the head 30 and communicates with a rearwardly extending passage 83. As shown in Figure 4, the passage 83 communicates with the fluid pressure supply passage 49 at the intake side of the valve 51. As a result, when the cylinder 28 is exhausted, the fluid pressure admitted to the annular space 81 returns the piston 27 and associated parts to their uppermost or inoperative positions. It will, of course, be understood that the fluid pressure in the annular space 81 acts on a much smaller area of the piston than the fluid pressure in the upper end of the cylinder 28 and, accordingly, does not interfere with downward movement of the piston by the fluid pressure admitted to the upper end of the cylinder 28.

Another important feature of this invention is to close the welding circuit to the electrodes in timed relation to the application of the forging pressure on the piston 27 or, in other words, in timed relation to movement of the valve 66 to its open position. In the present instance, the welding circuit is controlled by a switch 84 supported on the head 30 of the welder and shown in Figures 8 and 9. In detail, the switch 84 comprises a pair of stationary electrical contacts 85 projecting into a fluid pressure chamber 86 and carried by an insulating block 87 adapted to close the upper end of the pressure chamber. Also positioned within the pressure chamber 86 is a movable bridge member 88 operatively connected to a piston 89 and engageable with the stationary contacts 85 to close the welding circuit to the electrodes. The piston assembly 86 is suitably slidably supported in the switch casing and the lower end thereof projects into a second fluid pressure chamber 90.

Both chambers 86 and 90 communicate with the fluid pressure supply in a manner to be more fully hereinafter set forth, and the switch piston 89 is normally urged in a direction to disengage the contacts 86 from the contacts 85 to open the circuit by means of a spring 91. Attention is also called to the fact that the area of the piston assembly 89 exposed to the interior of the chamber 90 is substantially less than the area of the piston assembly exposed to the interior of the chamber 86. Thus, the fluid pressure admitted to the chamber 90 acts upon the relatively small end of the piston assembly 89 and overcomes the action of the spring 91 to engage the movable contact bridge 88 with the stationary contacts 85 to close the welding circuit. On the other hand, the fluid pressure admitted to the chamber 86 acts upon the relatively large end of the piston assembly 89 and when this pressure plus the force exerted by the spring 91 exceeds the pressure in the chamber 90, the bridge member 88 is moved away from the stationary contacts 85 to open the welding circuit.

Figure 3:
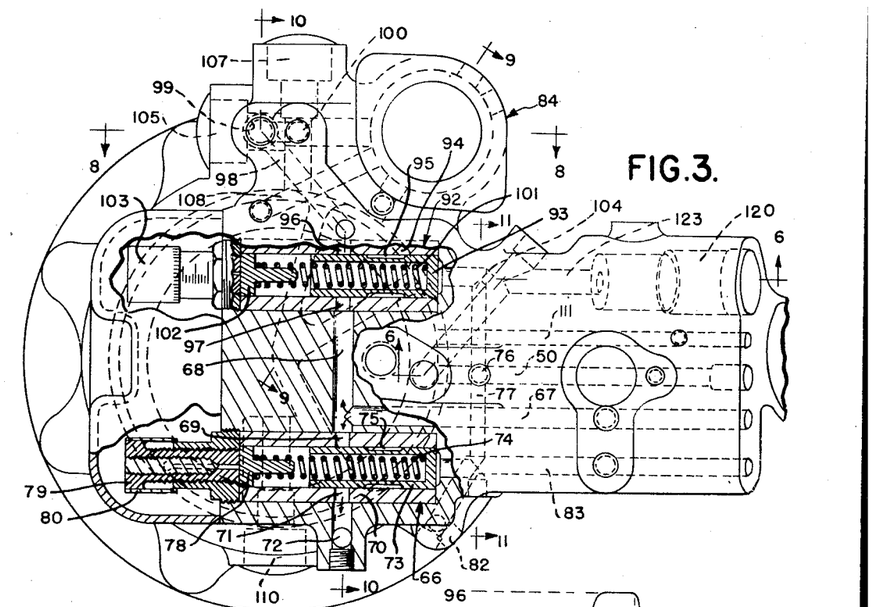
Figure 3 is a sectional view taken substantially on the plane indicated by the line 3—3 of Figure 2.
Figure 8:
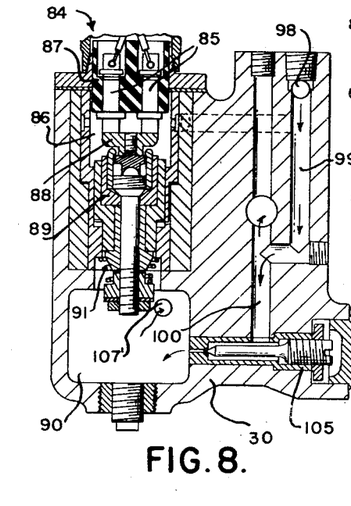
Figure 8 is a sectional view taken on the line 8—8 of Figure 3.
Figure 10:
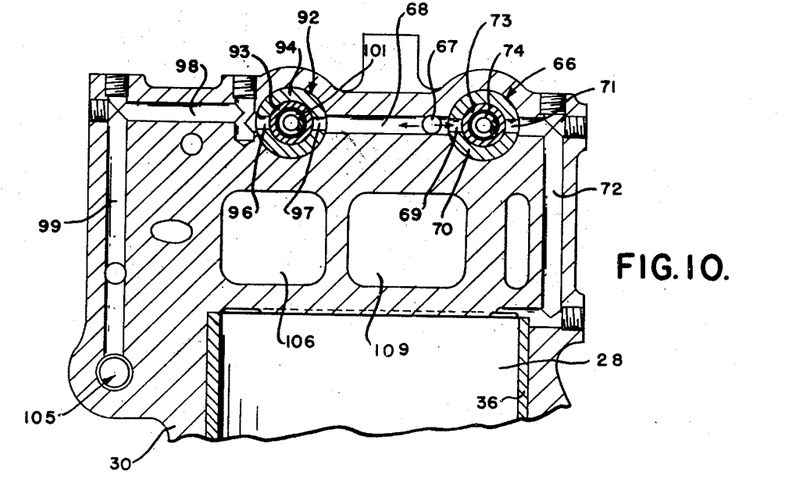
Figure 10 is a sectional view taken on the line 10—10 of Figure 3.

The switch is operated to close the welding circuit in predetermined timed relation to the application of the forging pressure on the work and is controlled by a valve 92 which is identical in construction to the valve 66 previously described. In detail, the valve 92 is provided with a plunger 93 slidably mounted in a valve casing 94 and having an annular recess 95 formed in the outer surface thereof intermediate the ends of the same. The valve casing 94 is provided with diametrically opposed ports 96 and 97. The port 97 communicates with the fluid pressure supply passage 67 through the medium of the passage 68, and the port 96 communicates with the switch chamber 90 through the medium of the passages 98, 99, and 100 (Figures 3 and 8).

The valve plunger 93 is normally urged into its uppermost position by means of a coil spring 101 having the upper end engaging the lower end of the plunger 93 and having the lower end resting upon a plunger 102. The plunger 102 is slidably mounted in the valve casing 94 and is adjustable to vary the tension of the spring 101 by means of an adjusting nut 103 identical in construction to the adjusting nut 79 previously described.

When the valve plunger 93 is in its uppermost position, communication from the fluid pressure supply line 67 to the switch is closed and remains closed until the pressure admitted to the cylinder 28 through the passage 50 exceeds a predetermined amount. In this connection, it will be noted that the upper end of the valve casing 94 communicates with the branch 76 of the fluid pressure supply line 50 by means of the passage 104 forming a part of the passage 77 which communicates with the upper end of the valve casing 73. It follows from the above that fluid under pressure from the metering valve 52 flows into the upper end of the valve casing 94, and when this pressure overcomes the force of the spring 101, the valve plunger 93 is moved downwardly to register the annular recess 95 therein with the ports 96 and 97. As a result, fluid under pressure from the supply line 67 is admitted to the switch chamber 90.

It is important to note that the valve 92 operates to control the flow of fluid pressure to the switch entirely independent of the valve 66 and, furthermore, the adjustment of the valve 92 is independent of the adjustment for the valve 66. Accordingly, the pressure of the fluid required to operate the valve 92 to supply a fluid pressure to the switch may be entirely different than the pressure of the fluid required to operate the valve 66. In fact, in the usual operation of the welder, the valve 92 will open before the valve 66 to supply fluid pressure to the chamber 90 of the switch prior to application of the forging pressure on the work by the electrode 21.

Figures 7, 9, 11:
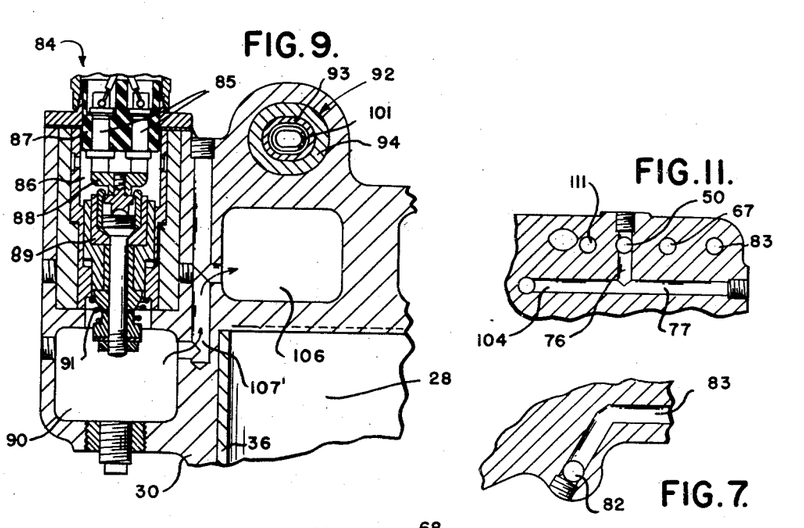
Figure 7 is a cross sectional view taken substantially on the line 7—7 of Figure 2.
Figure 9 is a sectional view taken on the line 9—9 of Figure 3.
Figure 11 is a sectional view taken on the line 11—11 of Figure 3.

The fluid pressure entering the chamber 90 of the switch from the passage 100 is regulated by a metering valve 105 and after entering the switch chamber 90 flows into an accumulating chamber 106 through the passage 107' (Figure 9). When the pressure in the chambers 90 and 106 builds up to a predetermined amount, the switch piston 89 is moved upwardly to bridge the contacts 85 with the bridge member 88 and thereby close the welding circuit to the electrodes. The valve 92 and the metering valve 105 are adjusted to effect operation of the switch to close the welding circuit before the valve 66 is opened to supply the forging pressure to the electrode cylinder 28. The particular pressure at which the switch operates to close the welding circuit may be accurately varied in relation to the pressure at which the valve 66 opens by adjusting both the valve 92 and the metering valve 105.

At the same time fluid under pressure is metered into the switch closing chamber 90, fluid under pressure is discharged into an accumulating chamber 106' through the medium of the passage 100 and a metering valve 107. Upon reference to Figures 1 and 2, it will be noted that the accumulating chamber 106' communicates with the switch opening chamber 86 through the medium of a passage 108. As previously stated, when the pressure in the switch opening chamber 86, acting upon the end of greatest area of the switch piston 89, exceeds the pressure in the switch closing chamber 90, acting on the relatively small end of the piston 89, the latter piston is moved in a downward direction to disengage the bridge member 88 from the contacts 85 and open the welding circuit. The time interval between closing of the switch and opening of the latter may, of course, be accurately varied by adjusting the needle valve 107 to control the pressure rise in the accumulating chamber 106' and in the switch opening chamber 86.

Figure 1:
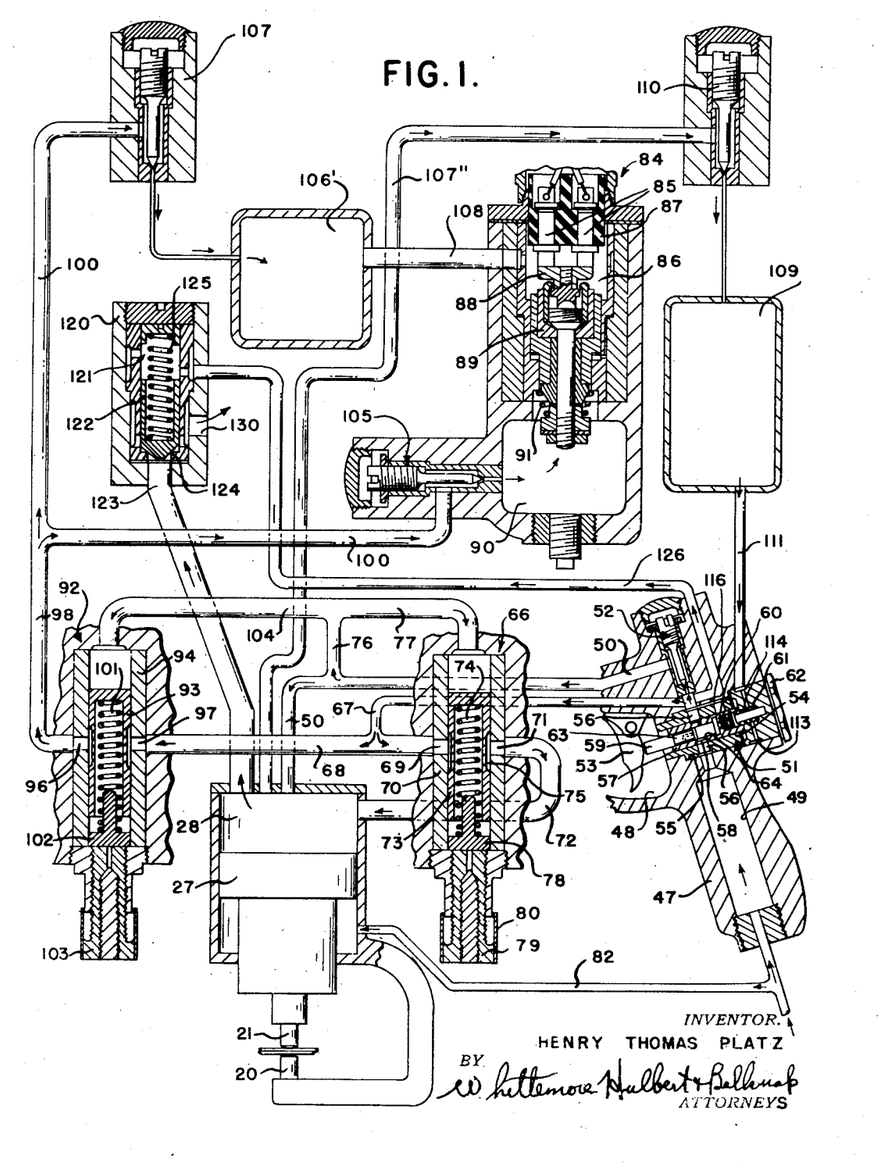
Figure 1 is a semi-diagrammatic view illustrating a welder incorporating the features of this invention.
Figure 12:
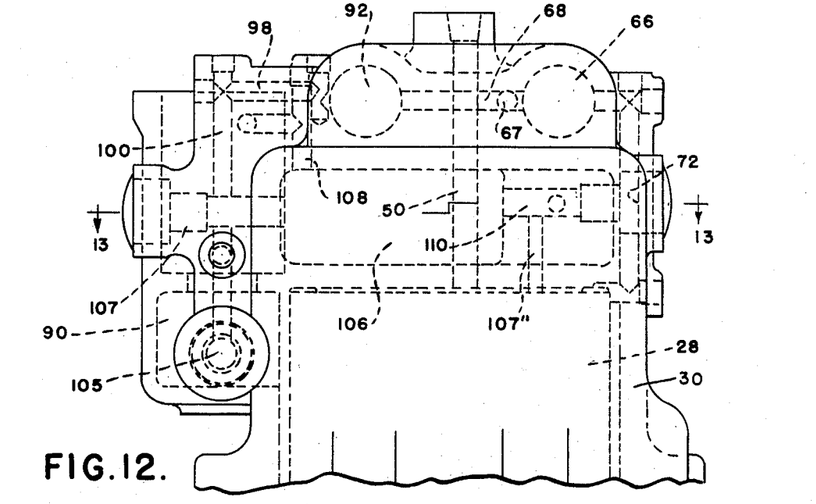
Figure 12 is a fragmentary elevation view of a portion of the welder shown in Figure 2.
Figure 13:
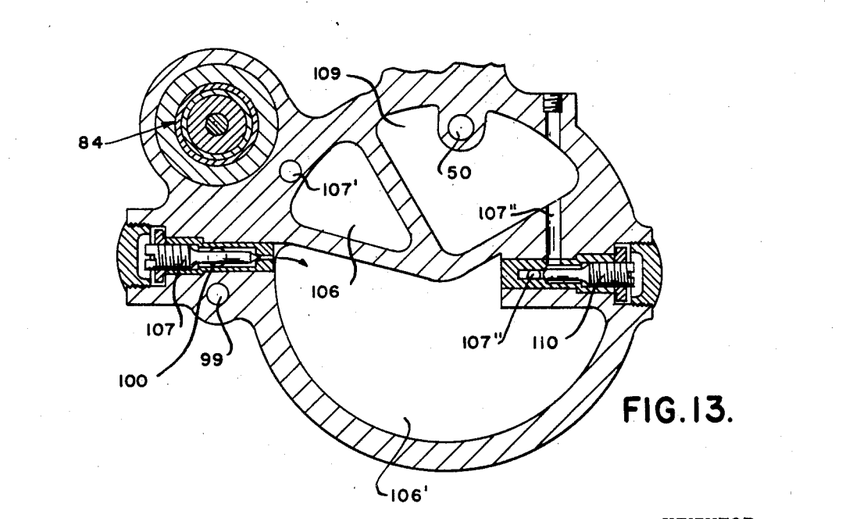
Figure 13 is a sectional view taken substantially on the line 13—13 of Figure 12.

Upon reference to Figures 1, 12, and 13, it will be noted that the fluid under pressure admitted to the cylinder 28 flows through a passage 107" into another accumulating chamber 109 and the rate of flow into the latter is regulated by a metering valve 110. Referring now to Figures 1, 3, and 4, it will be noted that the accumulating chamber 109 communicates with a fluid pressure return passage 111 which, in turn, communicates with the valve cylinder 54 at the rear side of the valve piston 57. Upon reference to Figure 5, it will be noted that fluid under pressure is admitted to the rear end of the valve cylinder 54 by means of a passage 112 extending from the passage 111 and communicating with an annular chamber 113 formed around the threaded shank of the plunger 62. The annular chamber 113 is shown in Figure 5 as communicating with a central recess 114 formed in the plug 62 and this recess, in turn, communicates with the rear end of the cylinder 54. It will be noted from the foregoing that the pressure admitted to the cylinder 54 from the accumulating chamber 109 acts upon a greater area of the piston than the fluid pressure flowing around the piston from the fluid pressure supply passage 49. Accordingly, when the fluid pressure in the cylinder 54 at the rear side of the piston 57 exceeds the force applied to the piston by the fluid pressure flowing around the piston from the supply passage 49, the piston 57 is moved in a forward direction to close communication between the supply passages 49 and 50. It follows from the foregoing that the rate of pressure rise in the cylinder 54 at the rear side of the piston 57 determines the interval in the welding cycle at which the flow of fluid pressure to the welder is discontinued and, in the present instance, this period may be regulated by adjusting the metering valve 110 previously described as controlling the flow of fluid under pressure into the accumulating chamber 109.

When the valve piston 57 is returned to its closed position, communication is established between an exhaust port 115 and both the passages 50 and 111. In this connection, it will be noted that the outer surface of the cylinder 54 is formed with an elongated passage 116 registering with the entrant end of the passage 50 and communicating with the rear end of the cylinder 54 which in turn communicates with the atmosphere. When this condition exists, the pressure in the electrode cylinder 28 drops and the fluid pressure in the annular chamber 81, acting on the underside of the head 37 of the piston, returns the piston and associated parts to their uppermost or inoperative positions. Inasmuch as the passage 111 also communicates with the rear end of the cylinder 54, it necessarily follows that when the piston 57 is in its forwardmost or inoperative position, the switch, chambers, and associated fluid passages are also exhausted.

In order to expedite return of the welder instrumentalities to their inoperative positions, I provide a pressure relief valve 120. The pressure relief valve 120 comprises a valve chamber 121 and a plunger 122 reciprocably mounted in the chamber. The lower end of the valve chamber 121 communicates with a passage 123 which in turn communicates with the interior of the cylinder 28. The lower end of the valve plunger 122 is normally urged into engagement with a valve seat 124 surrounding the upper end of the passage 123 by means of a coil spring 125. When the welder is in operation, the spring is assisted in holding the plunger 122 in its closed position by fluid under pressure admitted to the cylinder 121 above the plunger.

As shown in Figures 1, 4, 5, and 6, the fluid pressure supply line 67 communicates with the upper end of the cylinder 121 through the medium of a passage 126. As a result, movement of the valve plunger 122 to its open position by the fluid pressure admitted to the cylinder 28 is prevented. However, when the pressure in the cylinder 28 drops by connecting the latter to the exhaust through the valve 51, the resulting upward movement of the piston 27 in the cylinder 28 forces fluid under pressure upwardly through the passage 123 against the valve piston 122. Inasmuch as the valve cylinder 121 above the plunger 122 is also connected to the exhaust by the valve 51, it follows that the plunger 122 is moved upwardly against action of the spring 125 and fluid under pressure is exhausted through the port 130.

Operation

Having disclosed in detail the several instrumentalities of the welding device, reference will now be made to the manner in which the various instrumentalities cooperate to satisfactorily produce a weld. Assuming that the various parts of the welding device are in their inoperative positions, it will be noted that the operator initiates the weld by moving the trigger 53 rearwardly. As a result of this movement of the trigger, the valve plunger 59 is moved rearwardly to engage the partition 60 in the piston 57 and thereby effect a corresponding movement of the piston to the position shown in Figures 1 and 5 wherein the annular recess 58 registers with the ports 56. As pointed out above, movement of the piston 57 to its operative position also registers the passage 65 in the plunger 59 with the fluid pressure supply passage 49, with the result that fluid pressure builds up in the piston behind the plunger 59 and forces the latter outwardly against any pressure that may be applied to the trigger 53 by the operator. The control of the welder is then divorced from the operator and the various instrumentalities of the welder are automatically operated in proper timed relationship without any assistance from the operator.

When the valve piston 57 is in its operative or rearwardmost position, fluid under pressure is by-passed around the piston 57 to the supply passage 50. After this fluid under pressure flows through the metering valve 52, it is admitted to the upper end of the cylinder 28 and forces the piston in a downward direction to engage the electrode 21 with the work. At the same time fluid under pressure is admitted to the cylinder 28, fluid pressure is supplied to the upper ends of the valves 66 and 92 through the passages 77, 104 which communicate with the supply passage 50.

Figure 14:
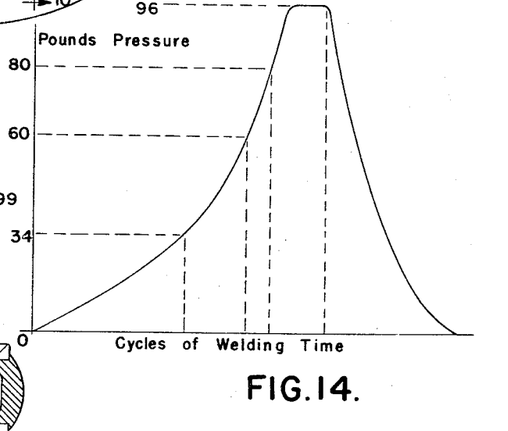
Figure 14 is a curve illustrating one cycle of operation of the welder.

When the fluid pressure admitted to the valves 66 and 92 exceed predetermined amounts, these valves are opened. The relationship between opening of the valves and the interval in the cycle that the latter are opened depends upon the particular work to be welded. In Figure 14, I have shown a curve illustrating a typical welding cycle for effecting a satisfactory weld of aluminum alloy.

Upon reference to Figure 14, it will be noted that the valve 92 is opened when the fluid pressure admitted to the electrode cylinder 28 approximates 34 lbs. per square inch. Opening of the valve 92 admits fluid under pressure to the switch closing chamber 90 through the metering valve 105 and this switch is operated to close the welding circuit to the electrodes. The valve 66 remains closed during the above operation and, in accordance with the specific illustration in Figure 14, does not open until the pressure in the cylinder 28 approximates 60 lbs. per square inch. Opening of the valve 66 admits fluid pressure to the cylinder 28 at a relatively high rate and applies a correspondingly greater force on the piston 27 which is transmitted to the electrode 21 in the manner previously described in detail.

The additional pressure applied to the piston 27 by opening of the valve 66 may be termed the forging pressure and in the present instance takes place during the interval the switch is closed or, in other words, during the welding period. This general arrangement is highly advantageous in welding metals having a high thermal conductivity, since it insures proper forging of the metal before the latter has an opportunity to solidify.

During the above operation, pressure is permitted to build up in the accumulating chamber 106' at a rate determined by the setting of the needle valve 107. The accumulating chamber 106' communicates with the switch opening chamber 86 and when the pressure in the latter becomes sufficient, the welding circuit is opened by the switch. As pointed out above, the duration of the weld may be accurately regulated by adjustment of the metering valve 107.

During the above operation, fluid pressure flows from the cylinder 28 through the passage 107" to the accumulating chamber 109 and the rate of flow of fluid pressure into the latter is regulated by the metering valve 110. When the pressure in the accumulating chamber 109 exceeds a predetermined amount, the valve piston 57 is moved forwardly to close communication from the supply passage 49 to the supply passage 50. For reasons hereinbefore described in detail, movement of the valve piston 57 to its foremost position connects the cylinder 28, switch, and associated passages to the exhaust port 115. The resulting drop in pressure in the cylinder 28 permits upward movement of the piston 27 by the action of the fluid pressure on the relatively small bottom surface of the head 37 of the piston and the pressure of the fluid in the passage 123 leading to the pressure relief valve 120 is increased. As a result, the pressure relief valve is operated to open the exhaust 130 and thereby effect a rapid exhaust of the welder.

What I claim as my invention is:

1. In an electric welding apparatus, an electrode movable into and out of engagement with the work to be welded, a cylinder communicating with a source of fluid under pressure, a metering valve controlling the rate of flow of fluid under pressure into the cylinder, a piston reciprocably mounted in the cylinder and connected to the electrode for moving the latter into engagement with the work under the action of the fluid pressure metered into the cylinder, means by-passing the metering valve for supplying additional fluid under pressure to the cylinder at a relatively fast rate and including a valve movable to its open position by the pressure in the cylinder when said pressure exceeds the amount required to effect engagement of the electrode with the work, and means for adjusting the last named valve to control the pressure at which the same opens.

2. In an electric welding apparatus, an electrode movable into and out of engagement with the work to be welded, a cylinder communicating with a source of fluid under pressure through the medium of two passages, a metering valve in one of the passages for regulating the flow of fluid under pressure into the cylinder, a piston slidably mounted in said cylinder and connected to the electrode for moving the latter into clamping engagement with the work to be welded under the action of the pressure supplied to the cylinder through the metering valve controlled passage, and a valve in the other of said passages movable to its open position in response to a sufficient pressure rise in the cylinder to engage the electrode with the work.

3. In an electric welding appartaus, an electrode movable into and out of engagement with the work to be welded, fluid pressure operated means for moving the electrode into engagement with the work, means for supplying fluid under pressure to the electrode operating means to effect movement of the electrode into engagement with the work, an electric circuit serving the electrode, means for closing the circuit in timed relation to engagement of the electrode with the work and for opening the circuit after a predetermined period of time elapses, and means for supplying additional fluid under pressure to the electrode operating means in timed relation to closing of the circuit including a valve operated directly by the fluid applied to the electrode moving means and movable to its open position in response to the application of a predetermined pressure on the electrode operating means.

4. In an electric welding apparatus, an electrode movable into and out of engagemnt with the work to be welded, fluid pressure operated means for moving the electrode into engagement with the work, means for supplying fluid under pressure to the electrode operating means to effect movement of the electrode into engagement with the work, an electric circuit serving the electrode, means for closing the circuit in timed relation to engagement of the electrode with the work and for opening the circuit after a predetermined period of time elapses, means for supplying additional fluid under pressure to the electrode operating means during the interval the circuit is closed including a valve free from mechanical connection with the electrode moving means and movable to its open position by the fluid pressure admitted to the electrode operating means, and means for adjusting the valve to vary the pressure at which said valve opens.

5. In an electric welding apparatus, an electrode movable into and out of engagement with the work to be welded, fluid pressure operated means for moving the electrode into engagement with the work, means for supplying fluid under pressure to the electrode operating means to effect movement of the electrode into engagement with the work, an electric circuit serving the electrode, a switch operated by fluid under pressure to close the circuit in timed relation to engagement of the electrode with the work and to open the circuit after a predetermined period of time elapses, a valve responsive to the application of a predetermined pressure on the electrode operating means to admit fluid pressure to the switch to close the latter, and a second valve responsive to the application of a pressure on the electrode operating means which is higher than the predetermined pressure required for operating the first named valve to supply additional fluid under pressure to said electrode operating means.

6. In an electric welding apparatus, an electrode movable into and out of engagement with the work to be welded, fluid pressure operated means for moving the electrode into engagement with the work, a fluid pressure supply passage communicating with the electrode operating means, a second fluid pressure supply passage communicating with the electrode operating means, an electric circuit serving the electrode, a switch operated by fluid under pressure to close said circuit, a valve operated by fluid under pressure flowing through the first passage when the pressure of this fluid acting on the electrode moving means assumes a predetermined value to admit fluid under pressure to the switch for closing the circuit, and a valve controlling the flow of fluid pressure through the second passage to said electrode moving means and movable to its open position by the fluid pressure acting on the electrode operating means when this pressure assumes a predetermined value higher than the value required to open the first valve.

7. In an electric welding apparatus, an electrode movable into and out of engagement with the work to be welded, a cylinder, a fluid pressure supply passage communicating with the cylinder, a second fluid pressure supply passage connected to said cylinder, a piston slidably mounted in the cylinder and connected to the electrode for moving the latter into engagement with the work under the action of the fluid pressure admitted to the cylinder through the first passage, an electric circuit serving the electrodes, a switch in the circuit movable by fluid under pressure to close the circuit and to open the circuit after a predetermined period of time period elapses, a valve controlling the flow of fluid pressure to the switch to close the latter and movable to its open position by the pressure of the fluid in the cylinder when this pressure assumes a predetermined value, and a valve controlling the flow of fluid pressure through the second passage to the cylinder and movable to its open position by the fluid pressure in the cylinder when this pressure assumes a predetermined value greater than the value required to open the first valve.

8. In an electric welding apparatus, an electrode movable into and out of engagement with the work to be welded, a cylinder communicating with a source of fluid under pressure, a piston slidably mounted in said cylinder and connected to the electrode for moving the latter into engagement with the work to be welded, an electric circuit serving the electrode, a switch operated by fluid under pressure to close the circuit in timed relation to engagement of the electrode with the work and to open the circuit after a predetermined period of time elapses, a valve operated directly by the pressure in said cylinder and responsive to a predetermined pressure rise in the cylinder to admit fluid pressure to the switch to close the latter, and a second valve operated directly by the fluid pressure in said cylinder and movable to its open position to supply additional fluid under pressure to the cylinder after the operation of said first valve to close said switch.

9. In electric welding apparatus, an electrode movable into and out of engagement with the work to be welded, an electric circuit serving the electrode, fluid pressure operated means for moving the electrode into engagement with the work, means for supplying fluid under pressure to the electrode moving means to effect movement of the electrode into engagement with the work, additional means for supplying fluid under pressure to the electrode moving means including a valve movable to its open position directly by the pressure applied to the electrode moving means, yieldable means acting on said valve for holding the valve closed and calibrated to permit opening of the valve by the pressure applied to the electrode moving means when this pressure exceeds the value required to effect engagement of the electrode with the work, and means for successively closing and opening the circuit to the electrode in timed relation to the operation of said valve.

10. In electric welding apparatus, an electrode movable into and out of engagement with the work to be welded, an electric circuit serving the electrode, fluid pressure operated means for moving the electrode into engagement with the work, means for supplying fluid under pressure to the electrode moving means to effect movement of the electrode into engagement with the work, additional means for supplying fluid under pressure to the electrode moving means at a rate exceeding the rate of flow from the first named supply means, said additional means including a valve movable to its open position by the pressure applied to the electrode moving means when this pressure exceeds the amount required to effect engagement of the electrode with the work, and means for successively closing and opening the circuit to the electrode in timed relation to the operation of said valve.

11. In an electric welding apparatus, an electrode movable into and out of engagement with the work to be welded, fluid pressure operated means for moving the electrode into engagement with the work, a fluid pressure supply passage communicating with the electrode operating means, a second fluid pressure supply passage also communicating with the electrode operating means and operable to supply fluid pressure to the electrode operating means at a faster rate than the first passage, and a valve controlling the flow of fluid pressure through the second passage to the fluid pressure operated means and movable to its open position by the fluid pressure admitted to the electrode operating means through the first passage when the pressure of this fluid exceeds the value required to move the electrode into engagement with the work.

12. In an electric welding apparatus, an electrode movable into and out of engagement with the work to be welded, fluid pressure operated means for moving the electrode into engagement with the work, a fluid pressure supply passage communicating with the electrode operating means, a metering valve in said passage for controlling the flow of fluid under pressure to the electrode operating means, an electric circuit serving the electrode, a switch in said circuit movable to its closed position by fluid under pressure, a second fluid pressure supply passage communicating with the first passage in advance of said needle valve and communicating with the switch, and means controlling the flow of fluid through the second passage to said switch and operable to delay closing of the switch until the electrode engages the work under the action of the fluid pressure flowing through the first passage, said means comprising a valve normally closing communication through the second passage and movable to its open position by the fluid pressure metered through the first passage.

13. In an electric welding apparatus, an electrode movable into and out of engagement with the work to be welded, fluid pressure operated means for moving the electrode into engagement with the work, means for supplying fluid under pressure to the electrode operating means to effect movement of the electrode into engagement with the work, additional means for supplying fluid under pressure to the electrode operating means for increasing the pressure on the electrode operating means, said additional means comprising a valve normally closing the additional supply of fluid under pressure to the electrode operating means and movable to its open position by the pressure of the fluid acting upon the electrode operating means in timed relation to engagement of the electrode with the work.

14. In an electric welding apparatus, an electrode movable into and out of engagement with the work to be welded, fluid pressure operated means for moving the electrode into engagement with the work, an electric circuit serving the electrode, means for supplying fluid under pressure to the electrode operating means to effect movement of the electrode into engagement with the work, additional means for supplying fluid under pressure to the electrode operating means for increasing the pressure on the electrode operating means, said additional means comprising a valve normally closing the additional supply of fluid under pressure to the electrode operating means and movable to its open position by the pressure of the fluid acting on the electrode operating means when this pressure exceeds the amount required to effect engagement of the electrode with the work, and means for closing the circuit to the electrode prior to movement of the valve to its open position and for opening the circuit to the electrode in timed relation to opening of said valve.

HENRY THOMAS PLATZ.